United States Patent [19]
Clearwaters

[11] 3,791,480
[45] Feb. 12, 1974

[54] STRESS RELIEF INSERT FOR FLEXIBLE TOWED ARRAY

[75] Inventor: Walter L. Clearwaters, Quaker Hill, Conn.

[73] Assignee: The United States of America as represented by the Secretary of the Navy, Washington, D.C.

[22] Filed: Oct. 13, 1972

[21] Appl. No.: 297,579

[52] U.S. Cl............... 181/.5 A, 138/109, 138/118, 340/7 R
[51] Int. Cl............................................. G01v 1/16
[58] Field of Search.......... 181/.5 A; 340/3 T, 7, 17; 138/109, 118, 120

[56] References Cited
UNITED STATES PATENTS
| | | | |
|---|---|---|---|
| 24,222 | 5/1859 | McBurrey | 138/120 |
| 2,447,697 | 8/1948 | Crotschall | 138/118 |
| 3,073,352 | 1/1963 | Bay | 138/109 |
| 3,432,000 | 3/1969 | Ongkiehong | 181/.5 A |
| 3,540,223 | 11/1970 | Ebbe | 138/109 |
| 3,648,226 | 3/1972 | Fitzpatrick | 340/3 T |

Primary Examiner—Benjamin A. Borchelt
Assistant Examiner—J. V. Doramus
Attorney, Agent, or Firm—Arthur A. McGill; Richard S. Sciascia; Prithvi C. Lall

[57] ABSTRACT

A stress relief insert of a generally cylindrical shape having a small inner diameter at one end and tapering out to a larger inner diameter at the other end. The insert is made of a flexible material and is positioned between one end of a flexible boot and a rigid end piece in a flexible towed array. The end having the smallest inner diameter is in contact with the rigid end piece of the towed array and the other end of the insert is in contact with the flexible boot over a length of the inner wall of the boot.

5 Claims, 3 Drawing Figures

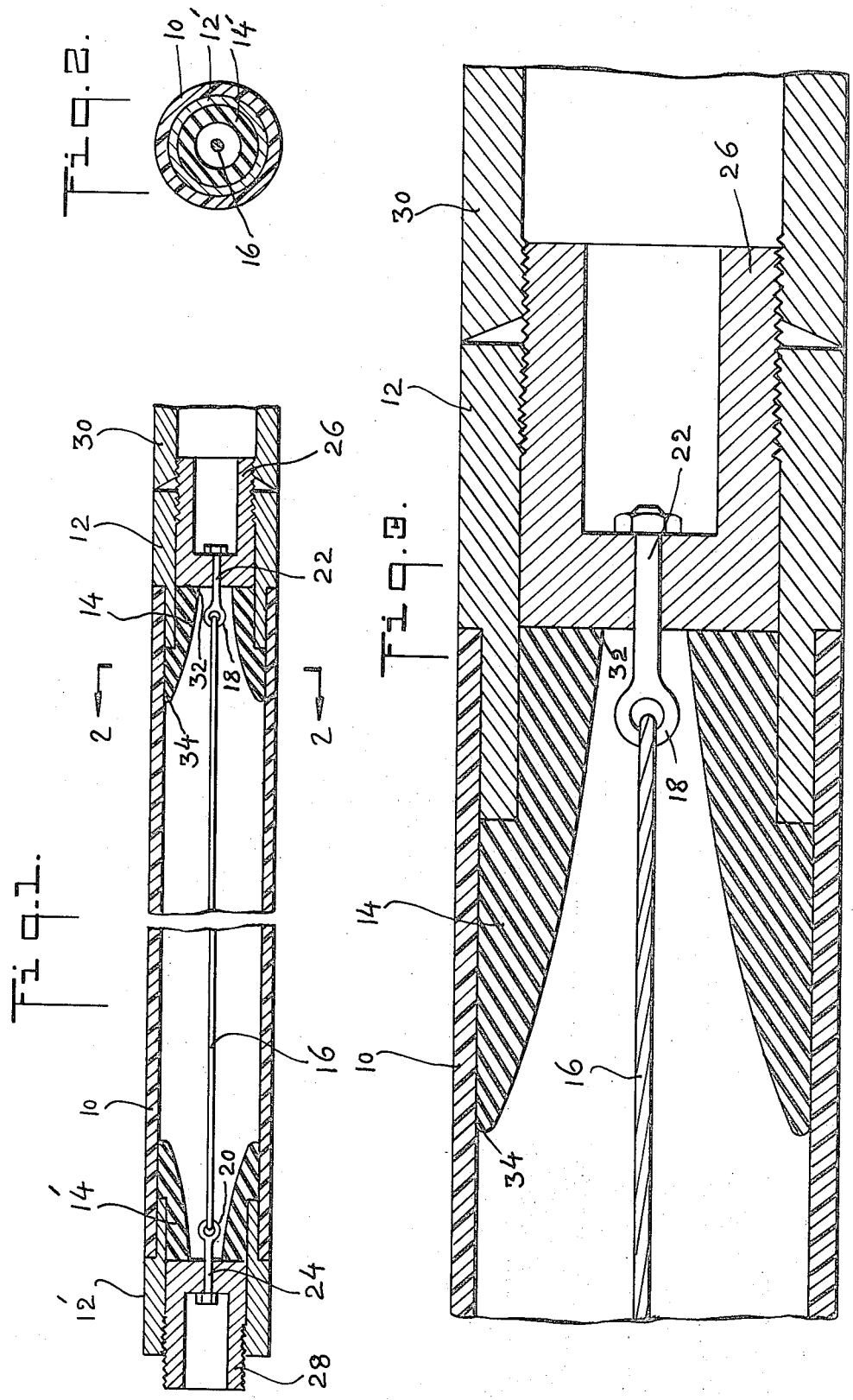

3,791,480

STRESS RELIEF INSERT FOR FLEXIBLE TOWED ARRAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to an improvement of an apparatus used in underwater systems involving a towed flexible array and more particularly to an improvement for increasing the operational reliability of a flexible towed array.

One of the problems in a flexible towed array system is the failure of the array boot at and near ends of the sections which are joined together. Such a failure is very expensive and requires time-consuming repairs. More detailed examination of failures of this type seem to indicate that they occurred where the flexible boot is fitted on to the rigid end piece in a flexible towed array.

SUMMARY OF THE INVENTION

The objects and advantages of the present invention are accomplished by having an insert which is used at the point of joining a rigid metallic end piece to the flexible boot of the flexible towed array. An insert of a generally cylindrical shape having its outer diameter smaller than its length or longitudinal dimension, and is made of a flexible material. The insert has a smaller inner diameter at one end, tapering to a larger inner diameter at the other end. The end of the insert having the smaller inner diameter is in contact with the rigid metallic end piece and the end having the larger inner diameter is in contact with the flexible boot along a length of the inner wall of the flexible boot. This configuration distributes the disruptive force over a larger area of the flexible boot and thus reduces stress at the points of high stress of the flexible boot.

it is an object of this invention to improve and increase the life of a flexible towed array.

It is another object of this invention to reduce stress at the points of high stress of the flexible boot of the flexible towed array.

Still antoher object of this invention is to reduce the number of time-consuming and expensive repairs necessary after the failures of the array boot.

Other objects advantages and novel features of the invention will become apparent from the following detailed description of the invention when considered in conjunction with the accompanying drawings wherein:

BRIEF DESCRIPTION OF THE DRAWINGS

FIG. 1 shows a section of a flexible towed array;

FIG. 2 is a cross section taken along the line 2—2 of FIG. 1; and

FIG. 3 is an enlarged view of one of the end portions of the flexible towed array section of FIG. 1.

DESCRIPTION OF A PREFERRED EMBODIMENT

Referring now to the drawings wherein like reference characters designate identical or corresponding parts throughout the several views, and more particularly to FIG. 1 thereof, a section of a flexible towed array is shown as consisting essentially of a flexible boot 10, rigied end pieces 12 and 12' and inserts 14 and 14'. A reinforcing bar 16 is connected to eyelets 18 and 20 of bolts 22 and 24 respectively. End pieces 12 and 12' are preferably made of a metal and are rigid. Rigid end piece 12 has a threaded end which is coupled to the threaded end piece 26 at one end and has its other end coupled to the flexible boot 10. End piece 26 houses the nut end of bolt 22 and is coupled to piece 30 as shown in FIGS. 1 and 3. End piece 12' is coupled to piece 28 in a similar fashion. Insert 14 is inserted between rigid end piece 12 and the flexible boot 10. The insert 14 is of generally cylindrical shape and is made of a flexible material, such as rubber. Insert 14 has smaller inner diameter at end 32 and has its length or longitudinal dimension larger than its outer diameter. The other end of the insert 14 is in contact with the flexible boot along its interior wall up to point 34 as shown in FIGS. 1 and 3.

As shown in FIG. 2, flexible boot 10 is surrounding metallic piece 12', which surrounds the insert 14', the reinforcing bar 16 being at the center.

As can be seen from FIGS. 1 and 3, the stress developed between the flexible boot 10 and end piece 12 or 12' is distributed over a much larger area because of insert 14. The shape of the insert is such that it distributes the bending area over a longitudinal distance of the flexible boot 10. This reduces the concentration of disruptive force developed during towing operations ans thus reduces stress at the points of high stress of the flexible boot.

As described above, the insert which is in contact with the rigid end piece at one end and the flexible boot at the other end distributes the disruptive force devloped during towing operation and thus reduces stress at points of high stress of the flexible boot. This reduces chances of failure of the flexible towed array and thereby increases its reliability.

Obviously many modifications and variations of the present invention are possible in the light of above teachings. As an example, the material of which the insert is made can be changed as long as the material is flexible. Further, the shape of the insert can be changed from generally cylindrical shape to another shape as long as the disruptive force caused during towing operations is distributed over a larger area and the stress developed at points of high stress of the flexible boot is reduced. It is therefore understood that within the scope of the appended claims the invention may be practiced otherwise than as specifically described.

I claim:

1. In a flexible towed array section comprising a flexible boot, an end piece coupled to said flexible boot at one end and a coupling piece at the other end thereof, and a reinforcing member coupled to said coupling piece, an improvement comprising:
 a generally cylindrical flexible rubber insert having an inner diameter at a first end smaller than an inner diameter at a second end thereof and having longitudinal dimension greater than the inner diameters at either end thereof, said rubber insert being coupled to said end piece at the first end of said rubber insert and in contact with said flexible boot at the second end of said rubber insert.

2. A flexible towed array section comprising:
 a flexible boot;

an end piece having a first end and a second end, the first end of said end piece being coupled to said flexible boot;

a coupling piece having a first end and a second end and coupled to the second end of said end piece proximate the first end of said coupling piece;

a reinforcing member adapted to couple to said coupling piece proximate the second end of said coupling piece; and a generally cylindrical flexible rubber insert having a smaller inner diameter at a first end than the inner diameter at a second end, said insert being coupled to said end piece at the first end thereof, and being in contact with said flexible boot along the length of said flexible boot.

3. The flexible towed array section of claim 2 wherein said rubber insert has longitudinal dimension greater than the inner diameter at either end of said rubber insert.

4. The flexible towed array section of claim 3 wherein said rubber insert is in contact with said flexible boot for a substantial part of the length of said rubber insert.

5. A flexible towed array section comprising:

a flexible boot;

a pair of end pieces, each of said end pieces having a first and second end, with the first end of each end piece coupled to opposite ends of said flexible boot;

a pair of coupling pieces, each of said coupling pieces having a first end and a second end, each of said first ends of said coupling pieces connected to the second end of each of said end pieces;

a pair of bolts having eyelets with each of said bolts being connected to each of said second ends of said coupling pieces;

a reinforcing member connecting said eyelets of said pair of bolts; and a pair of generally cylindrical flexible rubber inserts, each of said flexible rubber inserts having a smaller inner diameter at a first end than the inner diameter at the second end and having a longitudinal dimension greater than the inner diameter at either end of said rubber inserts, said inserts being coupled to said end pieces at said first ends of said end pieces and being in contact with said flexible boot along the remaining portion of said inserts.

* * * * *